July 27, 1965 P. D. JONES 3,197,676
ALTERNATING CURRENT OVERLOAD PROTECTION CIRCUITS
Filed Nov. 5, 1962
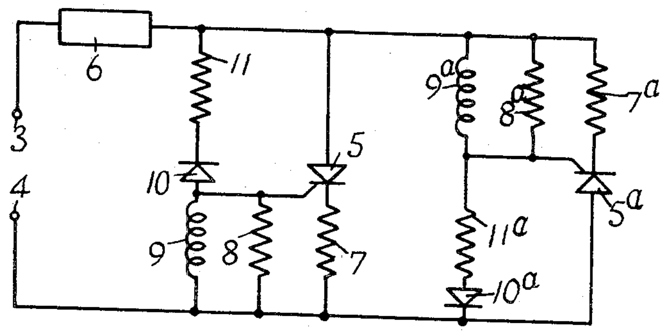

3,197,676

ALTERNATING CURRENT OVERLOAD PROTECTION CIRCUITS

Peter David Jones, Castle Bromwich, Birmingham, England, assignor to Joseph Lucas (Industries) Limited, Birmingham, England Filed Nov. 5, 1962, Ser. No. 239,861
Claims priority, application Great Britain, Nov. 22, 1961, 41,733/61
7 Claims. (Cl. 317—33)

The object of this invention is to provide an A.C. overload protection circuit in a convenient form.

The present invention makes use of a device known as a controlled rectifier, the characteristic of which is that if a triggering pulse is applied between its gate and cathode terminals the rectifier becomes conductive, and thereafter continues to conduct, even when the triggering pulse is removed, until the anode-cathode current falls practically to zero. Furthermore it has recently been discovered that controlled rectifiers manufactured in a certain manner have the additional property that they can be switched off by a pulse of opposite polarity (but not necessarily of equal magnitude) applied between the gate and cathode. Throughout this specification the term "switchable rectifier" is used to mean a controlled rectifier having this additional property, a convenient method of manufacturing a switchable rectifier being described in pending application No. 211,674.

A protection circuit in accordance with the invention comprises first and second terminals adapted for connection to an A.C. source, a switchable rectifier having its anode connected to the first terminal and its cathode connected to the second terminal through a first resistor, a load in the anode-cathode circuit of the switchable rectifier, resistance means connecting the gate of the switchable rectifier to the second terminal, an inductor connected between the gate and the second terminal, and a diode connected between the gate and the first terminal, the arrangement being such that the switchable rectifier is rendered conductive during alternative half-cycles of the supply, but is switched off when the current flowing in the load exceds a predetermined magnitude.

The accompanying drawing is a circuit diagram illustrating one example of the invention.

Referring to the drawing, there are provided first and second terminals 3, 4 adapted for connection to an A.C. source. The terminal 3 is connected to the anode of a switchable rectifier 5 through a load 6, the cathode of the switchable rectifier 5 being connected to the terminal 4 through a resistor 7.

The gate of the switchable rectifier is connected to the terminal 4 through a resistor 8 and an inductor 9 in parallel, and is further connected to the terminal 3 through a diode 10 and resistor 11 in series with the load 6. The operation of the circuit is unimpaired if the diode 10 and resistor 11 are connected directly to the terminal 3 instead of through the load 6.

During alternate half-cycles the switchable rectifier 5 is non-conductive and energy is stored in the inductor 9. During the intervening half-cycles, however, the energy in the inductor 9 switches on the switchable rectifier 5. The latter conducts unless the current flowing therethrough exceeds a predetermined magnitude, in which case the cathode voltage rises to a value sufficient to switch off the switchable rectifier, the gate voltage being held constant by the resistor 8.

The resistor 8 may be replaced by a Zener diode. Moreover, in order to obtain current through the load and protection during each half-cycle, a second similar circuit is conected to the supply terminals in the opposite manner as shown in the drawing, corresponding components in the second circuit having been designated the same reference numerals with the suffix *a*. A minor difference in the second circuit is that the positions of the resistor 11*a* and diode 10*a* are interchanged. This in no way affects the operation.

Having thus described my invention what I claim as new and desire to secure by Letters Patent is:

1. An A.C. overload protection circuit comprising in combination an A.C. source, first and second terminals connected to said A.C. source, a switchable rectifier having its anode connected to the first terminal, a first resistor through which the cathode of the switchable rectifier is connected to the second terminal, a load in the anode-cathode circuit of the switchable rectifier, resistance means connecting the gate of the switchable rectifier to the second terminal, an inductor connected across said resistance means, and a series circuit connecting the gate of the switchable rectifier to the first terminal, said series circuit including a diode, the switchable rectifier being non-conductive during alternate half-cycles in which energy is stored in said inductor, but being switched on during intervening half-cycles by the energy stored in said inductor, and said switchable rectifier being switched off when current flowing in the load exceeds a predetermined value.

2. A circuit as claimed in claim 1 in which said resistance means is constituted by a second resistor.

3. A circuit as claimed in claim 1 in which said resistance means is constituted by a Zener diode.

4. A circuit as claimed in claim 1 in which said series circuit includes a resistor.

5. A circuit as claimed in claim 1 in which the load is connected in the anode circuit of the switchable rectifier.

6. An A.C. overload protection circuit comprising in combination an A.C. source, first and second terminals connected to the A.C. source, a first switchable rectifier, a first resistor connecting the cathode of the first switchable rectifier to the second terminal, a load connecting the anode of the first switchable rectifier to the first terminal, a second resistor and a first inductor connected in parallel between the gate of the switchable rectifier and the second terminal, a series circuit connecting the gate of the switchable rectifier to the first terminal, said series circuit including a first diode and a third resistor, a second switchable rectifier having its anode connected to the second terminal, a fourth resistor connected in series with said load between the first terminal and the cathode of the second switchable rectifier, a fifth resistor connected in series with said load between the first terminal and the gate of the second switchable rectifier, a second inductor connected across the fifth resistor, and a second series circuit connecting the gate of the second switchable rectifier to the second terminal, said second series circuit including a sixth resistor and a second diode, the switchable rectifiers being rendered conductive in alternate half-cycles, but being switched off in the event of the current flowing in the load exceeding a predetermined value.

7. An A.C. overload protection circuit comprising in combination an A.C. source, first and second terminals connected to the A.C. source, a first switchable rectifier, a first resistor connecting the cathode of the first switchable rectifier to the second terminal, a load connecting the anode of the first switchable rectifier to the first terminal, a Zener diode and a first inductor connected in parallel between the gate of the first switchable rectifier and the second terminal, a first series circuit connecting the gate of the first switchable rectifier to the first terminal, said first series circuit including a first diode and a second resistor, a second switchable rectifier having its anode connected to the second terminal, a second resistor connected in series with said load between the first terminal and the cathode of the second switchable rectifier, a second Zener diode connected in series with said load between the first terminal and the gate of the second switchable rectifier, a second inductor connected across said second Zener diode, and a second series circuit connected between the gate of the second switchable rectifier and the second terminal, said second series circuit including a fourth resistor and a second diode, the switchable rectifiers being rendered conductive in alternate half-cycles but being switched off in the event of the current flowing in said load exceeding a predetermined magnitude.

No references cited.

SAMUEL BERNSTEIN, *Primary Examiner.*